United States Patent
Kim et al.

(10) Patent No.: US 8,488,574 B2
(45) Date of Patent: Jul. 16, 2013

(54) WIRELESS NETWORK SYSTEM AND ASSOCIATION CONTROL METHOD THEREOF

(75) Inventors: Chong Kwon Kim, Seoul (KR); Young Myoung Kang, Seoul (KR); Joon Soo Lee, Yongin (KR)

(73) Assignee: SNU R & DB Foundation, Seoul (KR)

( * ) Notice: Subject to any disclaimer, the term of this patent is extended or adjusted under 35 U.S.C. 154(b) by 266 days.

(21) Appl. No.: 12/939,933

(22) Filed: Nov. 4, 2010

(65) Prior Publication Data

US 2011/0305229 A1    Dec. 15, 2011

(30) Foreign Application Priority Data

Jun. 14, 2010 (KR) .................. 10-2010-0056171

(51) Int. Cl.
*H04W 4/00* (2009.01)
(52) U.S. Cl.
USPC ............ 370/338; 370/328; 370/329; 370/331
(58) Field of Classification Search
USPC ....................................................... 370/338
See application file for complete search history.

(56) References Cited

U.S. PATENT DOCUMENTS

| | | | |
|---|---|---|---|
| 2005/0195786 A1* | 9/2005 | Shpak | 370/338 |
| 2007/0086353 A1* | 4/2007 | Gefflaut et al. | 370/252 |
| 2008/0090575 A1* | 4/2008 | Barak et al. | 455/444 |
| 2011/0058478 A1* | 3/2011 | Krym et al. | 370/237 |

FOREIGN PATENT DOCUMENTS

| | | |
|---|---|---|
| KR | 1020070027053 A | 3/2007 |
| KR | 1020090029265 A | 3/2009 |
| KR | 1020100053241 A | 5/2010 |

* cited by examiner

*Primary Examiner* — Shripal Khajuria (57) ABSTRACT

Provided is an association control method for maximizing a message in message (MIM) function in a WLAN environment. According to an exemplary embodiment of the present invention, when all SINR values of transmission links to two or more first clients associated with the first access point are equal to or more than a predetermined capture threshold, SINR value of a transmission link to a second client associated with the second access point is less than the capture threshold, and at least one of the first clients, referred to as a third client group, can be associated with the second access point, associations are modified so that the third client group is associated with the second access point to enable concurrent transmission.

4 Claims, 7 Drawing Sheets

WIRELESS NETWORK SYSTEM AND ASSOCIATION CONTROL METHOD THEREOF

CROSS-REFERENCE TO RELATED APPLICATIONS

This application claims priority under 35 U.S.C. §119 to Korean Patent Application No. 10-2010-0056171, filed on Jun. 14, 2010, in the Korean Intellectual Property Office, the disclosure of which is incorporated herein by reference in its entirety.

TECHNICAL FIELD

The present invention relates to an opportunistic concurrent transmission method of a wireless network and a wireless network system using the same, and more particularly, to an opportunistic concurrent transmission method of a wireless network and a wireless network system using the same that can fully utilize the wireless capacity in terms of spatial reuse and maximize the system throughput.

BACKGROUND

Recent proliferation of IEEE 802.11 WLANs (Wireless local area networks) stems from its attractive features such as low chipset cost, ease of deployment, and sufficient bandwidth. As IEEE 802.11 WLANs becomes a dominant wireless access technology, it requires more efficient use of scarce wireless resources.

Distributed Coordination Function (DCF), the most popular MAC protocol for IEEE 802.11 WLANs, is very simple and its distributed operations show good performance in most environment. DCF which is based on CSMA/CA (Carrier Sense Multiple Access/Collision Avoidance) prohibits concurrent transmissions in order to avoid packet collisions and harmful interferences.

However, this basic collision protection scheme (CSMA/CA) may not fully utilize the wireless resources in terms of spatial reuse due to its conservative medium access control. If we adjust the transmission order and relative signal strength, we can successfully transmit multiple packets without the collision and channel error. We call this Capture Effect.

Previous wireless NICs (Network Interface Card) enables the PHY capture when an intended signal arrives until the middle of the preamble time of an interference signal. Of course, the SINR (Signal to Interference plus Noise Ratio) value of the intended signal must satisfy the required capture threshold. Recent MIM (Message in Message)-capable NICs such as Athelos increases the PHY capture probability by using enhanced preamble detection functionality. MIM-capable NICs can capture the intended signal with higher SINR ($\approx$10 dB) even if the intended signal arrives after the preamble time of an interference signal.

Figure 1A:
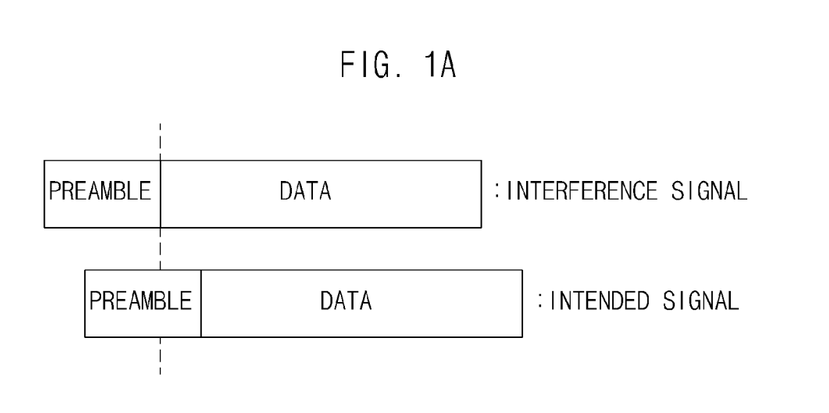
FIGS. 1A and 1B are diagrams showing transmission schedules of PHY capture and MIM capture, respectively.
Figure 1B:
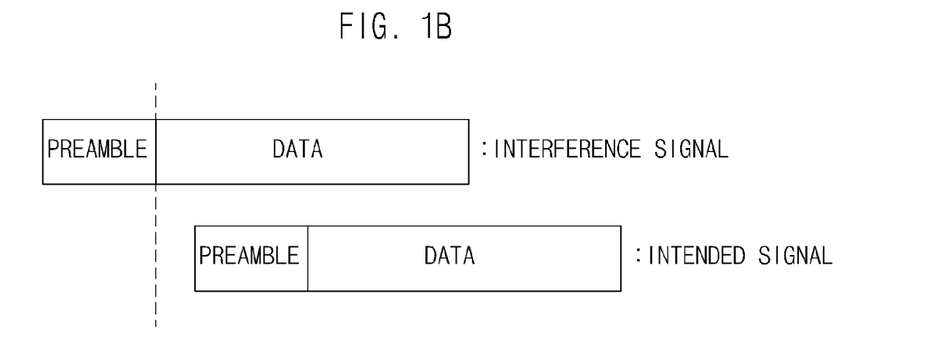

This is shown in FIG. 1. FIG. 1A shows PHY capture, and FIG. 1B shows MIM, respectively.

As shown in FIG. 1A, when an intended signal having high SINR of approximately 10 dB arrives within the preamble time of an interference signal, the intended signal can be captured.

With MIM function, an intended signal can be captured even though it arrives after the preamble time of an interference signal, as shown in FIG. 1B.

U.S. Pat. No. 5,987,033 is the related art for maximizing the PHY capture using MIM function. In U.S. Pat. No. 5,987,033, there are disclosed a receiver and a method for operating the receiver, for a station in a wireless local area network using a common wireless communication channel and employing a CSMA/CA protocol includes various modes. In normal mode, the receiver follows typical states in order to detect a message and demodulate data from the message properly. Meanwhile, a process implements a message-in-message (MIM) mode when an energy increase above a specified level is detected. While in the MIM mode, if a carrier is detected, the energy increase is caused by a new message; otherwise, the energy increase is caused by an interfering station. If the carrier is detected, the receiver begins retraining so that it can start receiving the new message as soon as the first message ends.

SUMMARY

An exemplary embodiment of the present invention provides an association control method for controlling associations in a wireless network system including a first access point and a second access point, comprising: verifying signal to interference plus noise ratio (SINR) values of transmission links to two or more first clients associated with the first access point and SINR value of a transmission links to a second client associated with the second access point; and when all of the SINR values of the transmission links to the first clients from the first access point are equal to or more than a predetermined capture threshold, the SINR value of the transmission link to the second client from the second access point is less than the capture threshold, and at least one of the first clients, referred to as a third client group, can be associated with the second access point, modifying associations in the wireless network system so as to associate the third client group with the second access point.

Herein, the method may further comprises: when one of the first and the second access points has a packet to transmit to the first client associated with the one of the first and the second access points, the one of the first and the second access points concurrently transmitting the packet while the other of the first and the second access points is transmitting another packet to the first client associated with the other of the first and the second access point, after the modifying of the associations.

The SINR value may be verified by referring to an interference map. The wireless network system may further include a central controller associated with the first and second access points, and the interference map may be provided by the central controller.

Another exemplary embodiment of the present invention provides a wireless network system including a first access point and a second access point, in which, when all of signal to interference plus noise ratio (SINR) values of transmission links to two or more first clients associated with the first access point from the first access point are equal to or more than a predetermined capture threshold, a SINR value of a transmission link to a second client associated with the second access point from the second access point is less than the capture threshold, and at least one of the first clients, referred to as a third client group, can be associated with the second access point, associations of the wireless network system is modified so as to associate the third client group with the second access point, and when one of the first and the second access points has a packet to transmit to the first client associated with the one of the first and the second access points, the one of the first and the second access points concurrently transmits the packet while the other of the first and the second access points is transmitting another packet to the first client associated with the other of the first and the second access point.

Other features and aspects will be apparent from the following detailed description, the drawings, and the claims.

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
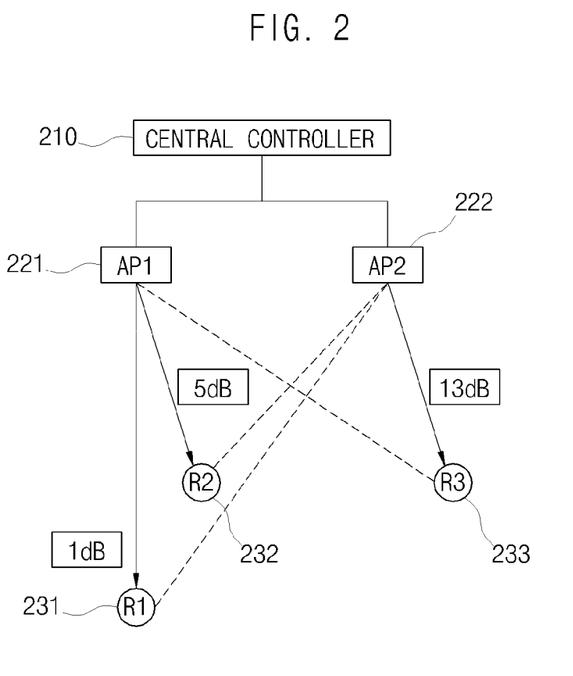
FIG. 2 is a diagram showing an operation of a WLAN system according to an exemplary embodiment of the present invention.

FIG. 2 is a diagram showing a WLAN system to which an opportunistic concurrent transmission method is applied according to an exemplary embodiment of the present invention.

As shown in FIG. 2, the WLAN system according to the exemplary embodiment of the present invention includes a central controller 210, two access points (APs) AP1; 221 and AP2; 222, and client devices R1; 231, R2; 232, and R3; 233 connected to each AP, respectively. Both APs are located within the transmission range of each other. Though two APs and three client devices are shown in FIG. 2 for better comprehension and ease of description, the numbers of APs and the client devices are not necessarily limited thereto.

In the figure, solid arrows mean a transmission link between an AP and a client device, and dashed lines denote interferences among concurrent transmissions. The value in a box indicates received SINR when packets are transmitted concurrently. That is, the clients R1 and R2 are associated with AP1 and a signal transmitted from AP2 becomes an interference signal for R1 and R2. On the contrary, the client R3 is associated with AP2 and, as a result, a signal transmitted from AP1 becomes the interference signal for R3. When concurrent transmission is made from AP1 and AP2, R1, R2, and R3 receive signals having SINRs of 1 dB, 5 dB, and 13 dB, respectively.

AP1 and AP2 may transmit concurrently by referring to an interference map. The interference map is a table of relative signal strength of each transmission depending on the transmission orders. In the exemplary embodiment shown in FIG. 1, the central controller 210 makes interference map from the individual report of each AP and distributes it to all APs. However, there are lots of schemes that make an interference map without a central controller.

Hereinafter, an opportunistic concurrent transmission method according to the exemplary embodiment of the present invention will be described referring to FIG. 2. It is assumed that each of AP1 and AP2 has packets to transmit to its associated clients R1 and R3, respectively.

Let AP1 transmit a packet to R1 first, and AP2 transmit a packet to R3 after the preamble time of the AP1's packet. AP1's transmission may result in a collision and cannot be decoded successfully by R1 since the SINR value (1 dB) of the received signal does not satisfy the capture threshold (4 dB). Of course, AP2's transmission may succeed due to a higher SINR value of 13 dB.

Now, let us change the transmission link. If AP1 transmits a packet to R2 not to R1, then a following concurrent transmission of AP2 may not corrupt the AP1's packet. The reason is that SINR value of R2 (5 dB) is higher than the capture threshold (4 dB).

Consequently, AP2 has an opportunity to transmit a packet concurrently with AP1 when AP1 send a packet to R2. AP2 can overhear the transmission of AP1 and knows which link is used in this transmission by sniffing the MAC header of the ongoing packet. Referring the interference map, AP2 knows that its concurrent transmission will not destroy the ongoing transmission of AP1. That is, AP2 assures its concurrent transmission satisfy the required SINR thresholds for capturing both packets.

When it is determined that the concurrent transmission will cause a problem, that is, when it is determined that the transmission of another AP will fail by the concurrent transmission, the AP defers its own transmission as a standard DCF operation.

Figure 3:
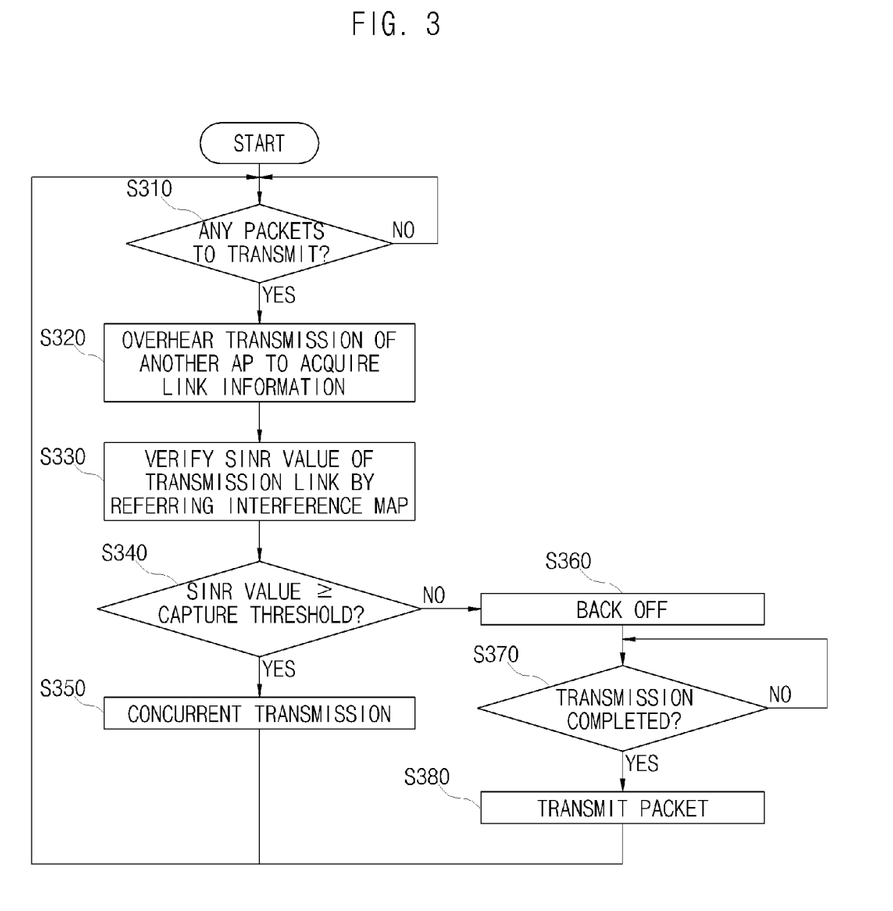
FIG. 3 is a flowchart showing an opportunistic concurrent transmission method from a viewpoint of one AP according to an exemplary embodiment of the present invention.

FIG. 3 is a flowchart showing an opportunistic concurrent transmission method from a viewpoint of one AP according to an exemplary embodiment of the present invention.

First, an AP determines whether there are packets to be transmitted (S310). If so, the AP overhears transmission from another AP to acquire information on a transmission link (S320). Next, AP finds out the SINR value for the transmission link by referring to the interference map (S330). If the SINR value is equal to or higher than the capture threshold (S340), the AP transmits its packets concurrently (S350). If the SINR value is lower than the capture threshold (S340), the AP enters the back off period (S360) and waits for the transmission to be completed. When the transmission in completed (S370), the AP transmits its own packets (S380).

Figure 4A:
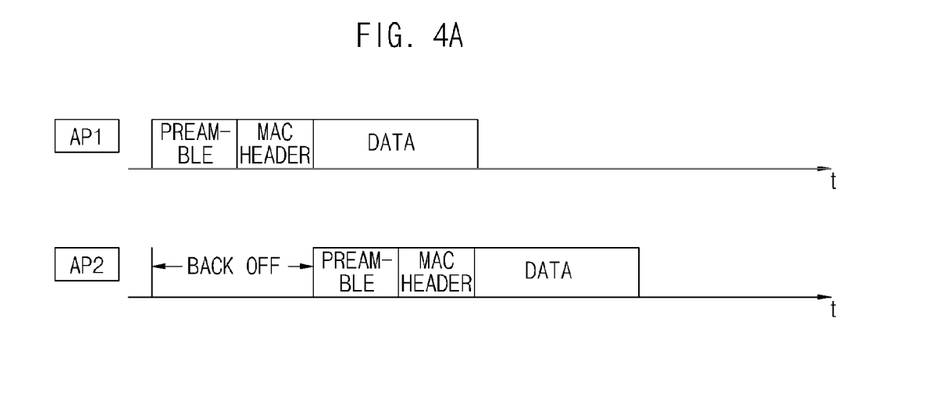
FIGS. 4A and 4B are diagrams showing frame schedules in a case of concurrent transmission and in an opposite case of non-concurrent transmission method according to the exemplary embodiment of the present invention, respectively.
Figure 4B:
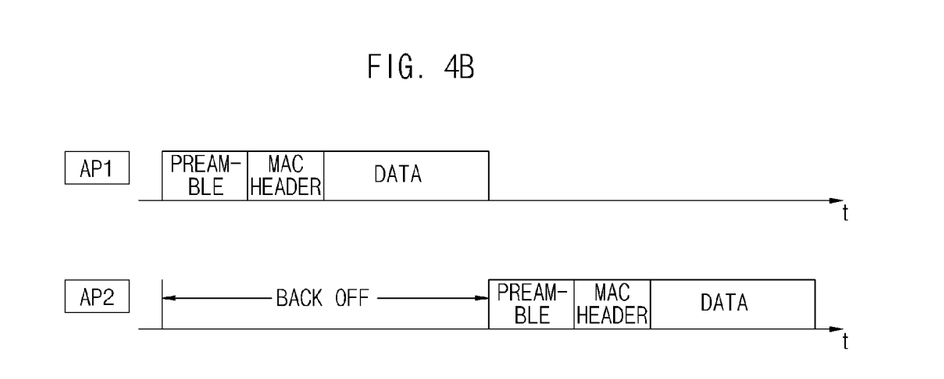

FIGS. 4A and 4B shows timings of the opportunistic concurrent transmission and non-concurrent transmission, respectively.

FIG. 4A shows the case of concurrent transmission. While AP1 is transmitting a frame, AP2 determines whether concurrent transmission can be made through a MAC header of the frame being transmitted by AP1 and the interference map. If AP2 determines to transmit concurrently, AP2 transmits its own frame right away.

On the contrary, FIG. 4B shows the case in which it is determined that concurrent transmission is not made. When AP2 overhears the transmission of AP1 and determines that concurrent transmission is not made, AP2 waits until the transmission of AP1 is completed and transmits its own frame later.

Meanwhile, the opportunistic concurrent transmission method according to the exemplary embodiment of the present invention operates well in broadcast scenario, because broadcasts do not use ACK packets. However, the opportunistic concurrent transmission method requires a more sophisticated ACK processing mechanism in unicast scenario. Here is one possible solution. We can avoid ACK collisions by scheduling ACK packets to be serialized by referring to the MAC header. That is, since a transmission time of the ACK frame can be found by referring a MAC header of a packet which another AP is transmitting, its own frame schedule may be planned not to be overlapped with the ACK frame of the packet which another AP is transmitting. For example, AP2 knows an ACK transmission time of AP1 by the MAC header information of AP1's packet in FIG. 4A.

A simulation is performed in order to compare the performances of the opportunistic concurrent transmission method according to the exemplary embodiment of the present invention and DCF. The expected throughput means the number of transmitted data bits divided by the total transmission time. We compare the expected through put of both DCF and the opportunistic concurrent transmission method according to the exemplary embodiment of the present invention with the broadcast operation. To simplify the analysis, we assumed that there is no collision. Therefore, the expected throughput of DCF is expressed as follows.

$$ET\_DCF = \frac{\text{data size}}{DIFS + BackOff + TXdur}$$

where $$TXdur = \frac{\text{data size} + MAC \text{ header} + \text{preamble}}{TXrate}$$

In the opportunistic concurrent transmission method according to the exemplary embodiment of the present invention, it requires additional one preamble time plus one MAC header time to send two packets simultaneously. Thus, we obtain the expected throughput of the opportunistic concurrent transmission method according to the exemplary embodiment of the present invention as followings. Herein, OMCT is an abbreviation of Opportunistic MIM-aware Concurrent Transmission which represents the opportunistic concurrent transmission according to the exemplary embodiment of the present invention.

$$ET\_OMCT = \frac{2*\text{data size}}{DIFS + BackOff + TXdur}$$

where $$TXdur = \frac{\text{data size} + 2(MAC \text{ header} + \text{preamble})}{TXrate}$$

Figure 5:
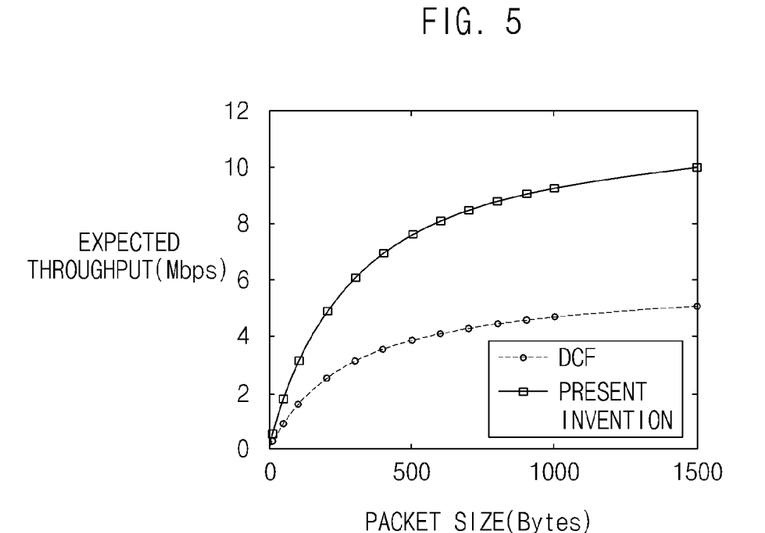
FIG. 5 is a graph showing expected throughputs of DCF and an exemplary embodiment of the present invention.

We insert the typical values of IEEE 802.11b parameters in equations above and get the results. FIG. 5 shows the expected throughput of both DCF and the exemplary embodiment of the present invention as a function of data size. We set the data rate 11 Mbps and vary the data size from 10 bytes to 1500 bytes. The result shows that the exemplary embodiment of the present invention outperforms DCF up to 200% in terms of the expected throughput.

In the exemplary embodiment described above, the opportunistic concurrent transmission method is used in a WLAN system, but the method is not limited thereto and may be applied to another wireless network system such as a wireless ad hoc network, or the like.

It is preferable that the opportunistic concurrent transmission method according to the exemplary embodiment of the present invention is applied only to a downlink transmission, the transmission from an AP to a client device, while an uplink transmission, the transmission from the client device to the AP, is made as a standard DCF operation. Despite of that, transmission efficiency can be remarkably improved. The reason is that in a general WLAN system, most transmissions are made as the downlink.

Hereinafter, an association control method between the AP and the client for utilizing the opportunistic concurrent transmission method according to the exemplary embodiment of the present invention to the maximum will be described.

Figure 6:
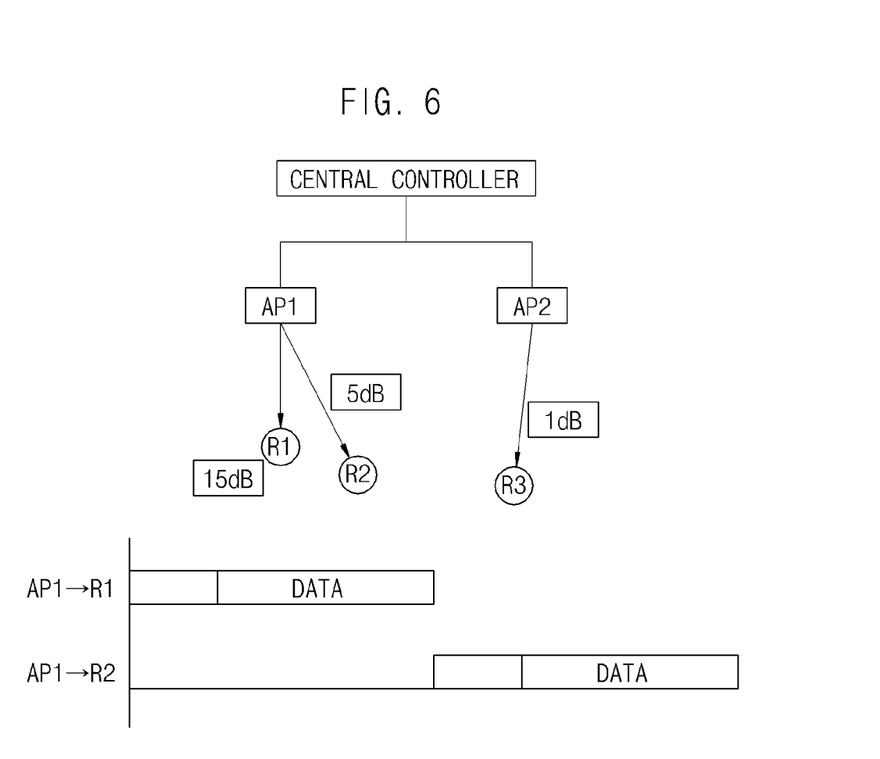
FIG. 6 shows an example of association in which the opportunistic concurrent transmission method according to an exemplary embodiment of the present invention cannot be applied.

FIG. 6 shows an example in which the opportunistic concurrent transmission method according to the exemplary embodiment of the present invention cannot be utilized.

As shown in FIG. 6, R1 and R2 are associated with AP1, and R3 is associated with AP2, respectively. Since a SINR value of R3, which is the client of AP2, is 1 dB, which cannot reach the capture threshold of 4 DB, AP1 and AP2 cannot utilize concurrent transmission using MIM. That is, AP1 should stand by while AP2 performs transmission, and AP1 may perform transmission to R1 or R2 after the transmission from AP2 to R3 is completed.

However, if R2 needs not to be associated with AP1 and may be associated with AP2, association of R2 can be changed to AP2 to enable concurrent transmission.

Figure 7:
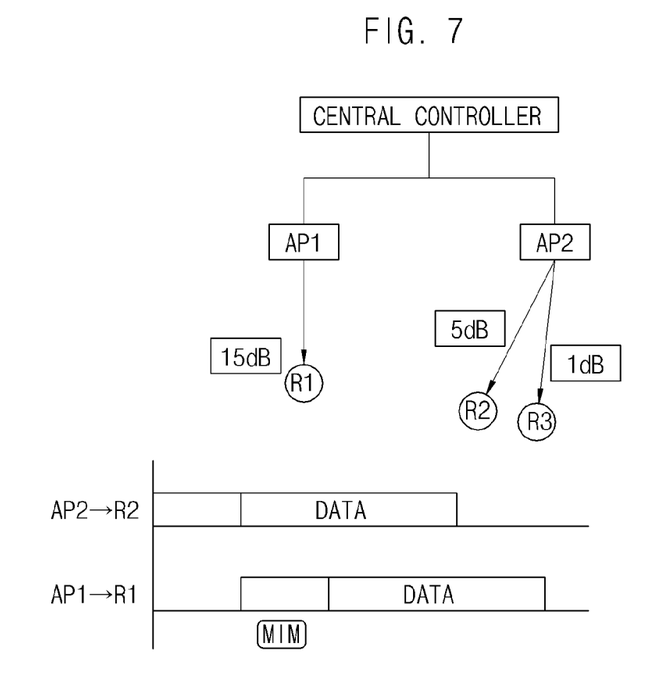
FIG. 7 shows an example of association in which the opportunistic concurrent transmission method according to an exemplary embodiment of the present invention is made to be applied by changing association shown in FIG. 6.

FIG. 7 shows an example of the case in which concurrent transmission is available by changing the association.

As shown in FIG. 7, R1 is associated with AP1, and R2 and R3 are associated with AP2, respectively. That is, association of R2 is changed to AP2 from AP1. Since the SNR value of R2, which is now the client of AP2, is 5 dB, which is higher than the capture threshold, capture becomes available despite of concurrent transmission. Therefore, as shown in FIG. 7, the transmission from AP1 to R1 may start during the transmission from AP2 to R2. Accordingly, the performance of the entire WLAN system can be improved.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An association control method for controlling associations in a wireless network system including a first access point and a second access point, comprising:

verifying signal to interference plus noise ratio (SINR) values of downlink transmission links to a first client and a second client associated with the first access point and SINR value of a downlink transmission links to a third client associated with the second access point, wherein the first access point and the second access point are within a downlink transmission interference distance of each other; and when all of the SINR values of the downlink transmission links to the first client and the second client from the first access point are equal to or more than a predetermined capture threshold, the SINR value of the downlink transmission link to the third client from the second access point is less than the capture threshold, and either of the first client or the second client, can be associated with the second access point, modifying associations in the wireless network system so as to associate either of the first client or the second client with the second access point; and after the modifying of the associations, when one of the first and the second access points has a packet to downlink transmit to either of the first client or the second client associated with the one of the first and the second access points, the one of the first and the second access points overhearing a transmission from the other of the first and second access points to the first client to know which link is used in the transmission, referring an interference map to check a SINR value of the link used, concurrently downlink transmitting the packet while the other of the first and the second access points is downlink transmitting another packet to either of the first client and the second client associated with the other of the first and the second access point and the SINR value of the link is equal to or more than the capture threshold;

wherein the SINR value is verified by referring to an interference map.

2. The method of claim 1, wherein: the wireless network system further includes a central controller associated with the first and the second access points, and the interference map is provided by the central controller.

3. A wireless network system including a first access point and a second access point, wherein:

when all of signal to interference plus noise ratio (SINR) values of downlink transmission links to a first client and a second client associated with the first access point from the first access point are equal to or more than a predetermined capture threshold, a SINR value of a downlink transmission link to a third client associated with the second access point from the second access point is less than the capture threshold, and at least one of the first client and the second client, can be associated with the second access point, associations of the wireless network system is modified so as to associate either of the third client group first client or the second client with the second access point, wherein the first access point and the second access point are within a downlink transmission interference distance of each other; and when one of the first and the second access points has a packet to downlink transmit to either of the first client or the second client associated with the one of the first and the second access points, the one of the first and the second access points overhearing a transmission from the other of the first and the second access points to the first client to know which link is used in the transmission, referring an interference map to check a SINR value of the link used, concurrently downlink transmits the packet while the other of the first and the second access points is downlink transmitting another packet to either of the first client or the second client associated with the other of the first and the second access point and the SINR value of the link is equal to or more than the capture threshold;

wherein the SINR value is verified by referring to an interference map.

4. The system of claim 3, wherein: the wireless network system further includes a central controller associated with the first and the second access points, and the interference map is provided by the central controller.

* * * * *